US005695703A

United States Patent [19]

Craven et al.

[11] Patent Number: 5,695,703

[45] Date of Patent: Dec. 9, 1997

[54] METHOD OF MANUFACTURING CLAY POTS WITH POCKETS

[76] Inventors: Billy Joe Craven; Marc Lee Craven, both of Rte. 1, 6640, Gillsville, Ga. 30529

[21] Appl. No.: 508,977

[22] Filed: Jul. 28, 1995

[51] Int. Cl.[6] .............................. B28B 1/48; B29D 19/08; C04B 33/32; B29C 67/20

[52] U.S. Cl. .......................... 264/154; 264/155; 264/320; 47/82; 47/83; 425/263; 425/268; 425/459

[58] Field of Search .............................. 264/56, 320, 154, 264/155, 67; 47/82, 83; 425/263, 268, 459

[56] References Cited

U.S. PATENT DOCUMENTS

| | | | |
|---|---|---|---|
| 1,740,057 | 7/1929 | Babich . | |
| 1,993,631 | 6/1935 | Smith | 47/34 |
| 3,374,574 | 3/1968 | Haile | 47/34.12 |
| 3,394,495 | 7/1968 | Mills | 47/34.12 |
| 4,123,873 | 11/1978 | Canova | 47/83 |
| 4,614,056 | 9/1986 | Farkas | 47/67 |
| 5,136,807 | 8/1992 | Orlov | 47/83 |
| 5,484,234 | 1/1996 | Worden | 405/284 |

*Primary Examiner*—Donald E. Czaja
*Assistant Examiner*—Jacqueline A. Ruller
*Attorney, Agent, or Firm*—Hinkle & Associates, P.C.

[57] ABSTRACT

Pockets for clay jars are made without adding clay after throwing the shape of the jar by cutting an arcuate slot into the jar; pushing the inside wall of the jar to open the slot, pressing the outside surface of the jar above the slot inward, rounding the ends of the slot, smoothing the lower edge of the slot, holding a pocket mold against the jar, pressing the inside wall of the jar located below the slot into the mold, and removing the mold.

3 Claims, 4 Drawing Sheets

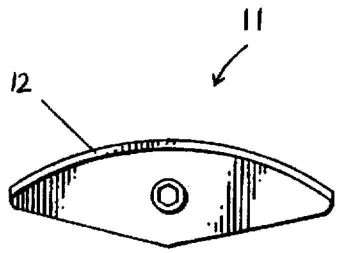
FIG_1A
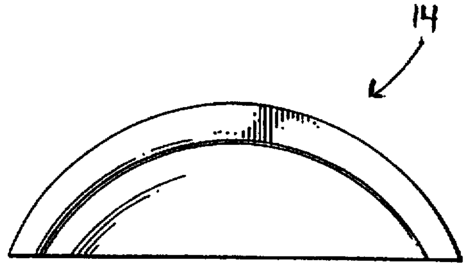
FIG_2A
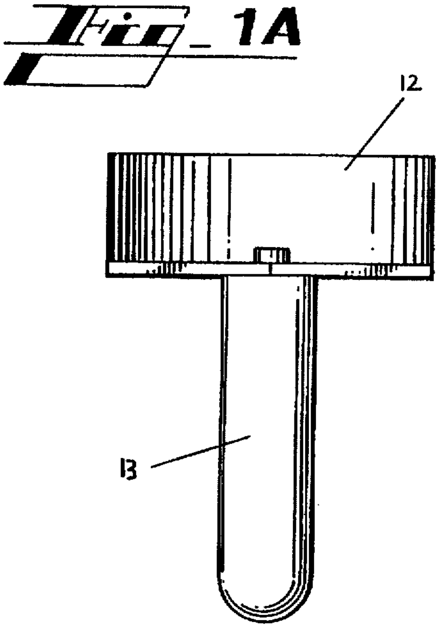
FIG_1B
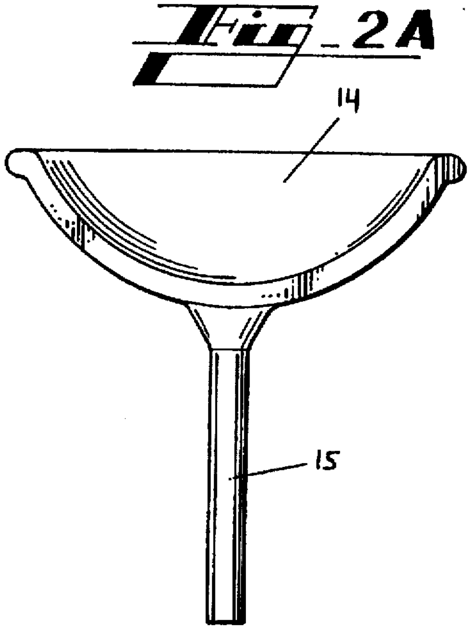
FIG_2B
FIG_3
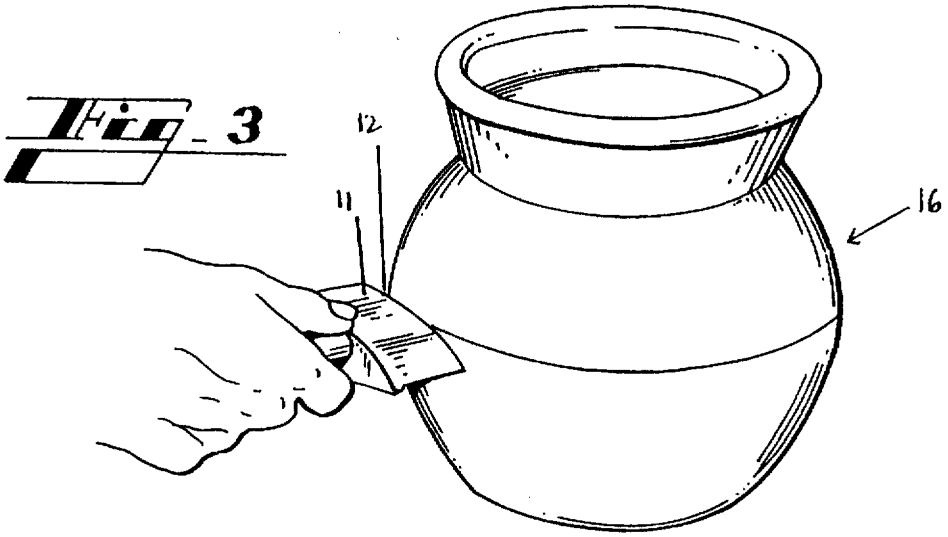

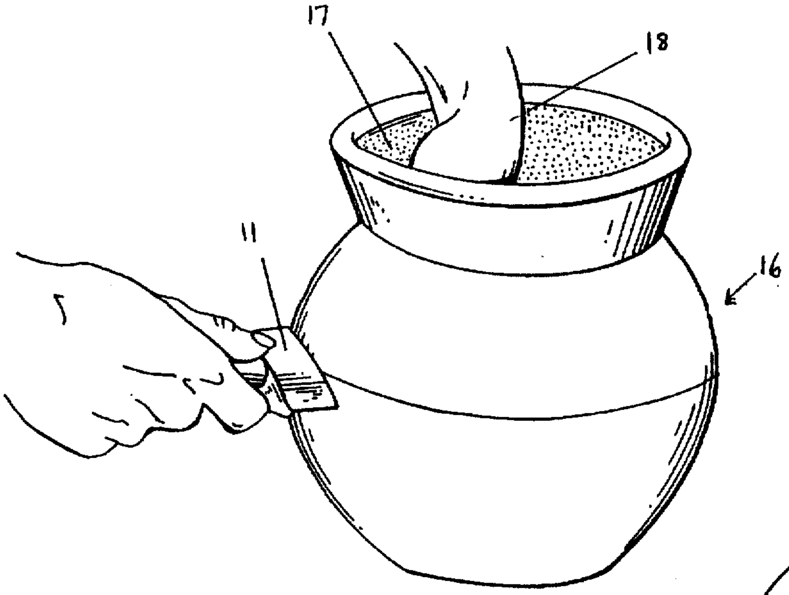
Fig. 4
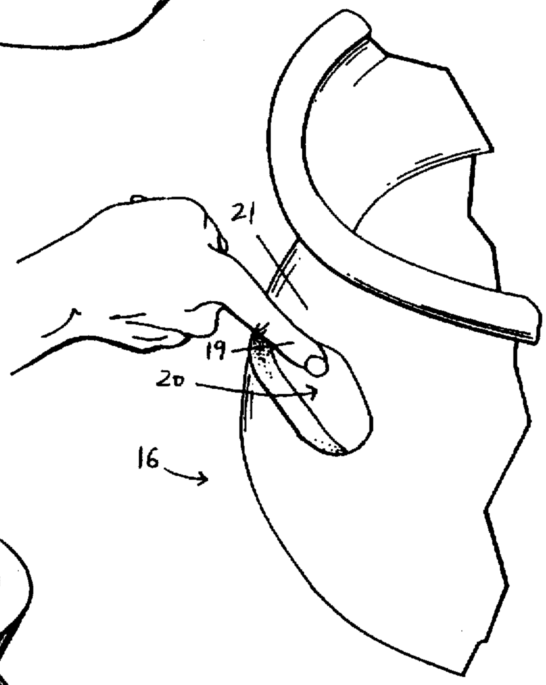
Fig. 6
Fig. 5
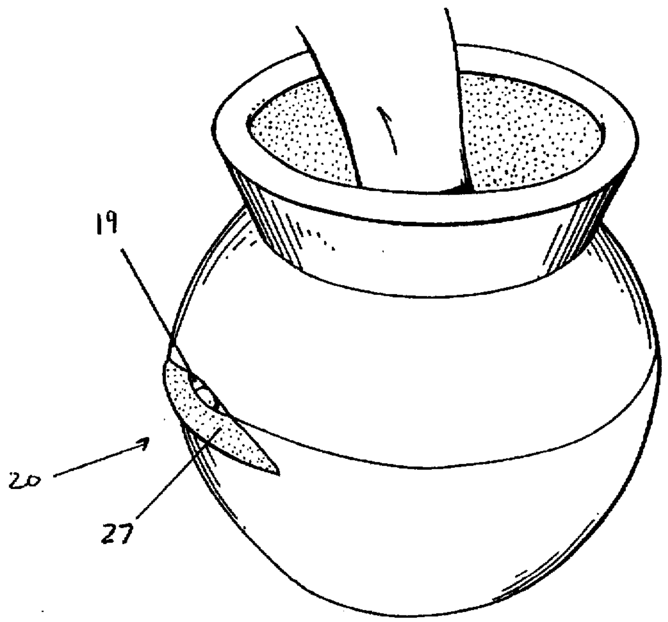

METHOD OF MANUFACTURING CLAY POTS WITH POCKETS

BACKGROUND OF THE INVENTION

I. Field of the Invention

The present invention relates generally to the manufacture of pottery, and particularly to the manufacture of a large clay jar with pockets.

II. Description of the Related Art

In the craft of clay pottery, some of the most popular designs include various shapes and sizes of flower pots. It is common for the pots to be equipped with handles, pockets and other decorations which may serve functional or merely decorative purposes. One of the popular commercial designs for pottery is a large pocket "strawberry" jar. The jar is used primarily for planting strawberry plants but may be used for planting a variety of other plants. For this purpose the jar is equipped with a number of pockets which extend outward from the body of the jar and allow a space for filling in potting soil and planting a plant. Also, additional plants can be located in the main body of the jar.

The standard method for making a large pocket strawberry jar is to first throw the clay on a pottery wheel into a large cylindrical shape. The outline of the jar is usually tapered inward to form a neck and then tapered back outward. At the top edge of the jar the shape is finished with an outer rim. The pockets are added onto the thrown shape with additional clay which is hand molded. First, an oval hole is cut into the side of the raw jar and then the pocket is formed by hand and then attached to the jar. Attaching the separate piece of clay to the jar requires care to make sure that the joints between the jar and the pockets are formed properly. Also, the moisture content in the additional clay piece must be at a level appropriate for the moisture content in the jar to prevent problems from different reactions to the heat of the kiln.

SUMMARY OF THE INVENTION

The method of the present invention comprises the steps for forming pockets in a large clay jar without adding additional clay to the thrown piece. The method of the present invention commences with the cutting of a slot into the raw clay jar. The slot is cut by a pocket cutter which has been lubricated with water. The slot is narrow, arcuate and approximately four inches in length. Other size slots may be cut for the various jar sizes to keep the resulting pockets in proper size proportion to the jar. In order to support the wall of the jar while the cutter is pushed through it, the opposite hand of the potter may be placed inside the jar to hold the wall. During the manipulations of the clay object by the potter, the hands are always lubricated with water. After the cut is made, the inside surface of the jar is pushed out far enough for one finger to fit through the opening. Next, the section of the outer surface above the cut is pushed inward with a finger. After the outer surface above the cut is pushed inward, the ends of the cut are smoothed and rounded by the fingers. In the next step the bottom edge of the slot is rounded and smoothed by pressing down on the bottom edge with the index finger and middle finger using a back and forth motion. In order to form a pocket, a pocket mold which has been lubricated with water is held against the surface of the clay jar and is positioned to surround the open lower edge of the cut in the jar. With the pocket mold in place, the middle and index fingers are extended, held together straight, and placed inside the open lower edge of the cut in the jar. A rapid back and forth motion is used to press the clay from the end of the fingers into the mold. The clay is distributed into the mold from the bottom of the pocket to the top. This motion is repeated until the pocket mold is completely filled. In the final step, the mold is removed and the pocket is inspected for flaws. Minor imperfections such as rough spots are removed by applying light pressure to the areas with a wet sponge. Each step for forming the pocket is repeated if the potter desires to add additional pockets to the clay jar.

Accordingly, it is an object of the present invention to improve the process of manufacturing clay "strawberry" jars by eliminating the need for an extra piece of clay to form the pocket.

It is another object of the present invention to eliminate the problems associated with adding a separate piece of clay to a thrown piece due to the moisture content of the extra piece and the problems associated with the joints formed between the thrown piece and the hand molded piece.

It is another object of the present invention to reduce the amount of time required to manufacture a clay strawberry jar by eliminating the hand molding of the pocket for the jar.

Other objects, advantages and capabilities of the invention will become apparent from the following description taken in conjunction with the accompanying drawings showing preferred embodiments of the invention.

BRIEF DESCRIPTION OF THE DRAWINGS

FIG. 1A is a top view of a pocket cutter which is used to implement the method of the present invention;

FIG. 1B is a side elevation view of the pocket cutter;

FIG. 2A is a top view of a pocket mold which is used to implement the method of the present invention;

FIG. 2B is a side elevation view of the pocket mold;

FIG. 3 illustrates the pocket cutter being inserted into the wall of the jar;

FIG. 4 illustrates the inside of the jar being supported by one hand of the potter while the other hand is used to push the pocket cutter through the wall of the jar;

FIG. 5 illustrates the pushing of the inside surface of the jar at the point inside the jar where the slot was made by the pocket cutter;

FIG. 6 illustrates the pressing inward of the section of the jar on the outside surface above the slot;

DESCRIPTION OF THE PREFERRED EMBODIMENTS

Figure 7:
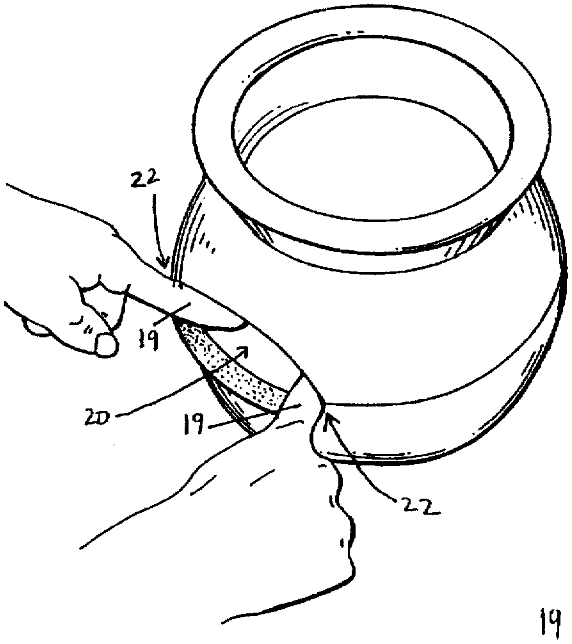
FIG. 7 illustrates the smoothing of the ends of the slot into a circular arc by the fingers.

Referring to the drawings wherein like reference numerals designate corresponding parts throughout the several figures, and initially referring to FIG. 1A showing a pocket cutter 11. The pocket cutter 11 is constructed of 24 gauge stainless steel and the blade 12 is four inches long by one inch wide. The blade 12 is arcuate along its length with a one-half inch radius. As shown in FIG. 1B, the blade 12 is attached to a wooden handle 13 which is approximately four inches long and one inch wide.

FIG. 2A illustrates a pocket mold 14 which is constructed in the shape of a quarter of a sphere. The pocket mold 14 is approximately four inches long and one and one-half inches wide. The pocket mold 14 is preferably constructed of fiber glass with a thickness of three-sixteenths of an inch. As shown in FIG. 2B, the pocket mold 14 also has a handle 15 which is approximately four inches long and one-half of an inch thick.

Turning to FIG. 3, the method of the present invention begins with the insertion of the pocket cutter 11 into the side of a clay jar 16. The pocket cutter 11 is lubricated with water before it is inserted into the clay jar 16. The cutter 11 is positioned so that the top of the arc of the blade 12 is positioned below the hole line on the jar 16. The cutter is held level at all times. As shown in FIG. 4, the opposite hand 18 of the potter may be placed inside the jar to support the inside surface 17 while the blade 12 is pushed completely through the wall of the jar.

The next step, which is shown in FIG. 5, comprises pushing a finger 19 from the inside of the jar through the slot 20 made by the pocket cutter 11. The wall 27 is pushed until the slot 20 is large enough for the finger 19 to fit through. The fingers of the potter are kept lubricated with water at all times while manual operations are being performed on the clay.

Next, the outer surface 21 of the jar 16 above the slot 20 is pushed inward as shown in FIG. 6.

As an alternative, the shape of the clay pot shown in FIG. 6 may be formed without reaching inside the pot. In order to do so, the step shown in FIG. 6 is performed instead of the step shown in FIG. 5, and then the inside surface below the slot is pushed outward after reaching the finger 19 into the clay jar from the outside.

The next step is shown in FIG. 7 and includes the rounding and smoothing of the two ends 22 of the slot 20. The operation is performed by taking a lubricated finger and gently smoothing the two ends 22 of the slot 20 into rounded off curves 23 (the curve 23 is shown in FIG. 8).

Figure 8:
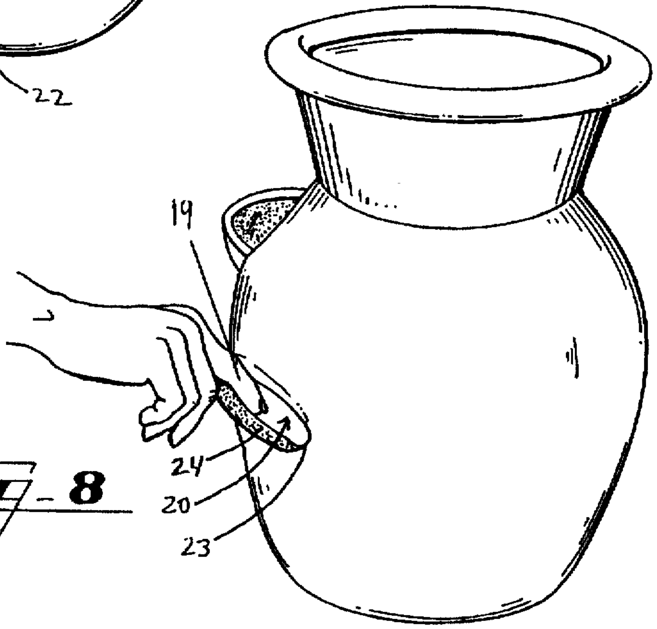
FIG. 8 illustrates the rounding and smoothing of the bottom edge of the slot.

After the rounding and smoothing of the two ends 22 of the slot 20, the lower edge 24 of the slot 20 is smoothed and rounded as shown in FIG. 8. By pressing down with a lubricated finger 19 and utilizing a back and forth motion, the lower edge of the slot 20 is smoothed and rounded.

Figure 9:
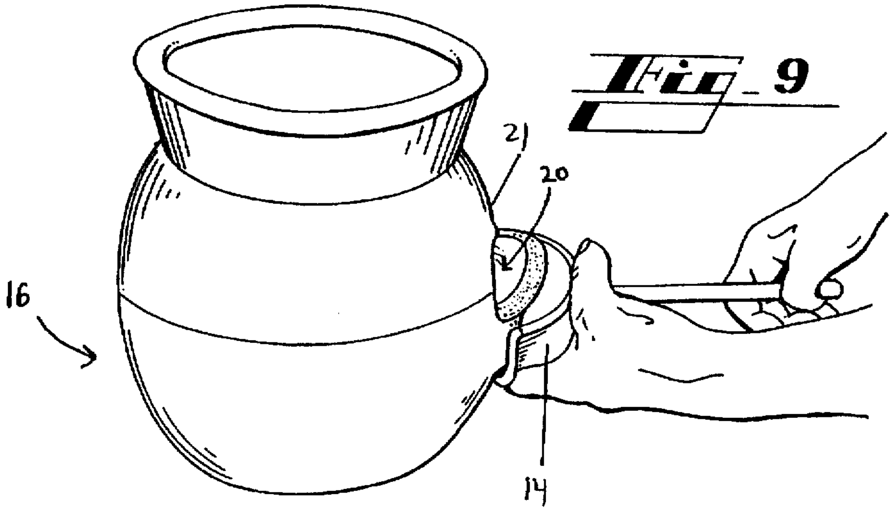
FIG. 9 illustrates the use of the pocket mold which is pressed against the outside of the jar and maintained in a level position.

The next step is shown in FIG. 9 in which the pocket mold 14 is held next to the outer surface 21 of the clay jar 16. The mold 14 is lubricated with water and is pressed firmly against the surface of the jar 16. The mold 14 is positioned to surround the slot 20 in the jar. For best results, the mold should be held as close to level as possible.

Figure 10:
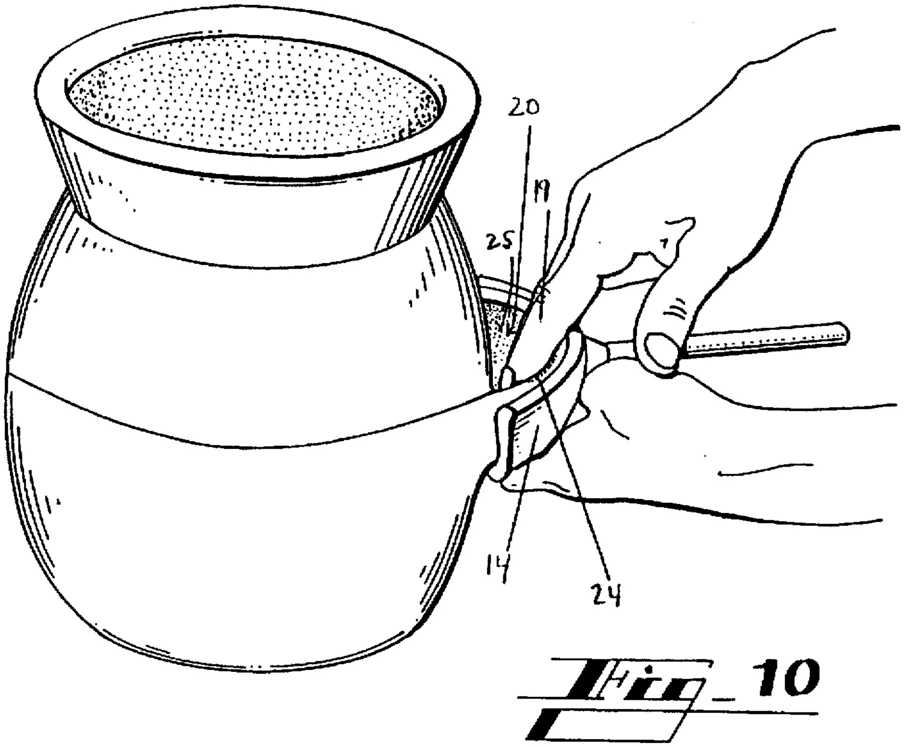
FIG. 10 illustrates the use of the pocket mold by pushing the clay against the outline of the mold.

With the mold 14 in place, the clay 25 is pressed against the outline of the mold 14 by the middle and index fingers 19 which are held together and extended as shown in FIG. 10. The fingers are extended into the open lower edge 24 of the slot 20 in the jar 16, and using a rapid back and forth motion, the clay 25 is pressed into the mold 14 from the bottom of the pocket 26 to the top. The clay 25 is spread out until it completely fills the pocket mold 14.

Figure 11:
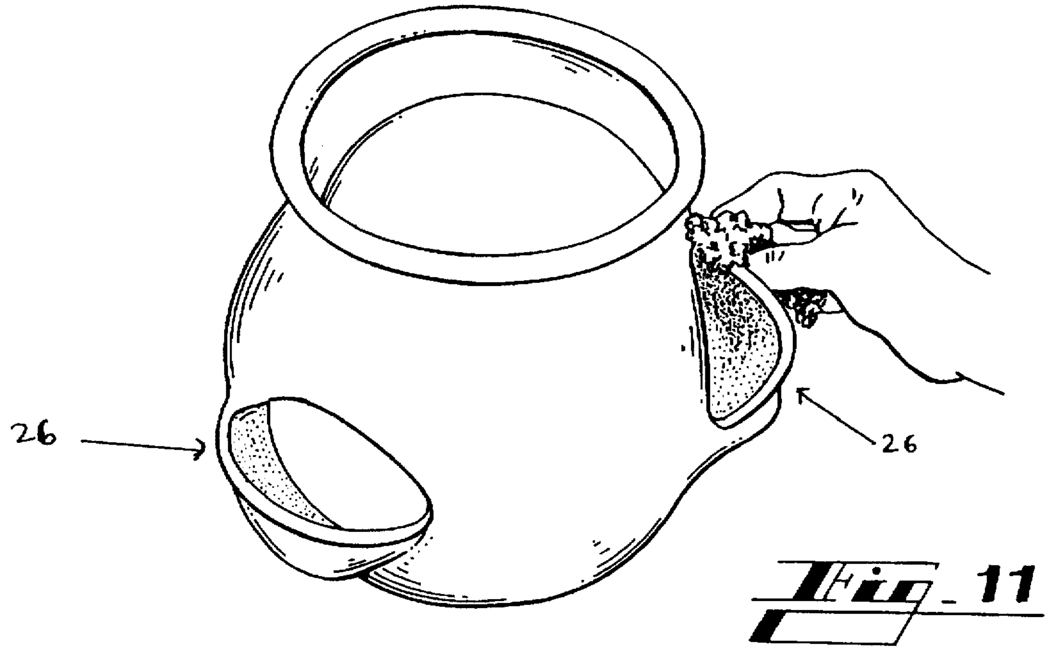
FIG. 11 illustrates the finishing process whereby a wet sponge is run across the surface of the finished jar to smooth out any remaining rough spots.

Referring to FIG. 11, in the final step the mold 14 is removed and the pocket 26 is inspected for any imperfections. Minor rough spots can be removed by using a wet sponge. If additional pockets are desired, the process should be repeated for each pocket.

Various modifications may be made of the invention without departing from the scope thereof and it is desired, therefore, that only such limitations shall be placed thereon as are imposed by the prior art and which are set forth in the appended claims.

What is claimed is:

1. A method of manually making pockets on a raw clay jar using a pocket cutter and a pocket mold, the clay jar having an inside surface, an outside surface, and an opening, the method comprising:
   - (a) lubricating the pocket cutter;
   - (b) cutting an arcuate slot into the raw clay jar with the lubricated pocket cutter, the slot having two ends, a lower edge, and an upper edge;
   - (c) manually pressing the outside surface located above the slot inward;
   - (d) manually pushing the inside surface located below the slot outward;
   - (e) manually rounding the two ends of the slot into a smooth radius;
   - (f) manually smoothing out the lower edge of the slot;
   - (g) lubricating the pocket mold;
   - (h) manually holding the pocket mold against the outside surface of the raw clay jar below the slot;
   - (i) manually pressing on the inside surface of the, jar from below the lower edge of the slot in the jar to fill the mold;
   - (j) removing the mold.

2. A method of manually making pockets on a raw clay jar using a pocket cutter and a pocket mold, the clay jar having an inside surface, an outside surface, and an opening, the method comprising:
   - (a) lubricating the pocket cutter;
   - (b) cutting a slot through the raw clay jar with the pocket cutter while manually supporting the inside surface, the slot having two ends, a lower edge, and an upper edge;
   - (c) manually pushing the inside surface of the jar located below the slot outward with a lubricated finger until the slot is large enough to fit the finger through the slot;
   - (d) manually pushing the outside surface inward with a lubricated finger at a point located above the slot;
   - (e) manually smoothing each end of the slot into a round corner;
   - (f) manually smoothing the lower edge of the slot with a lubricated finger;
   - (g) lubricating the pocket mold;
   - (h) manually holding the pocket mold against the outside surface of the jar below the slot;
   - (i) manually pushing the portion of the inside surface of the clay jar located below the slot, into the pocket mold with a lubricated finger;
   - (j) removing the mold.

3. A method of manually making pockets on a raw clay jar using a pocket cutter and pocket mold, the clay jar having an inside surface, an outside surface, and an opening, the method comprising:
   - (a) lubricating the pocket cutter with water;
   - (b) cutting an arcuate shaped slot through the wall of the jar while manually supporting the inside surface of the jar, the slot having two ends, a lower edge, and an upper edge;
   - (c) manually pushing the outside surface located above the slot inward with a lubricated finger;

(d) manually pushing the inside surface of the jar outward with an index finger lubricated with water to provide enough clearance for the finger to fit through the slot;

(e) manually smoothing each end of the slot into a round corner with an index finger lubricated with water;

(f) manually smoothing the lower edge of the slot by pressing down on the edge with an index and middle finger lubricated with water, which fingers are held together, using a back and forth motion to smooth and round the edge;

(g) lubricating the pocket mold with water;

(h) manually holding the lubricated pocket mold against the jar at a level position below the slot;

(i) manually pressing the clay from inside lower edge of the slot into the mold by working the clay from the bottom of the mold to the top of the mold with the index and middle fingers extended straight and held together, while holding the pocket mold in position;

(j) removing tile mold.

* * * * *